INVENTOR
DALE M. KOHLER,

INVENTOR
DALE M. KOHLER,

United States Patent Office 3,333,991
Patented Aug. 1, 1967

3,333,991
PRODUCTION OF CUBE-ON-EDGE ORIENTED SILICON-IRON
Dale M. Kohler, Middletown, Ohio, assignor to Armco Steel Corporation, Middletown, Ohio, a corporation of Ohio
Filed May 19, 1965, Ser. No. 457,095
4 Claims. (Cl. 148—111)

ABSTRACT OF THE DISCLOSURE

A process of producing cube-on-edge oriented silicon-iron sheet stock wherein the sheet stock contains from about 2% to about 3.5% silicon and from about .03% to about .15% manganese, and wherein the process includes the steps of hot rolling, removing scale, cold rolling to final gauge, and subjecting the stock to a final anneal consisting of a primary grain growth stage and a secondary grain growth stage. Sulfur is provided in the environment of the stock during the primary grain growth state of the final anneal so as to inhibit primary grain growth and to favor growth of cube-on-edge oriented nuclei during the secondary grain growth stage. The quantity of sulfur is proportioned to the quantity of manganese in the silicon-iron and the final gauge of the sheet stock.

Figure 1:
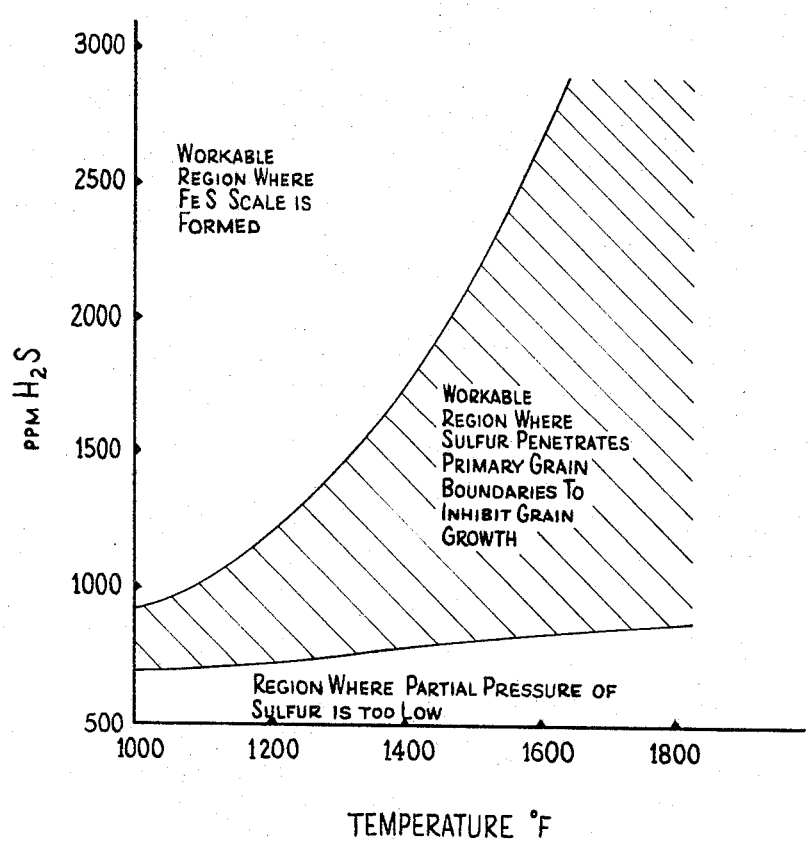

This is a continuation-in-part of the co-pending application in the name of the same inventor, Ser. No. 378,823, filed June 29, 1964, and entitled, Production of Oriented Silicon-Iron, and of the copending application in the name of the same inventor, Ser. No. 445,146, filed Apr. 2, 1965, and entitled, The Production of Thin Oriented Silicon-Iron.

This invention relates to the production of silicon-iron sheet stock for magnetic uses, and in which the body-centered cubes making up the grains or crystals are oriented in the cube-on-edge position, designated (110) [001] in accordance with Miller's indices. As is well known, stocks having this orientation are characterized by a relatively high permeability in the rolling direction and a relatively low permeability in a direction at a right angle thereto. The term "relatively" is used because ladle chemistry and processing variables affect the straight grain permeability even in materials having predominantly the orientation indicated above. Also the matter of grain size is important in the magnetic performance of the final product.

The greater part of the cube-on-edge oriented silicon-iron sheet stock is currently made by hot rolling ingots or slabs of a suitable composition to an intermediate gauge, pickling and heat treating the hot-rolled product, cold rolling it to gauge, usually in two stages, with an intermediate anneal, and subjecting it to a final anneal at a temperature high enough to cause secondary recrystallization. The secondary recrystallization has been of the grain boundary energy type.

The various factors of processing and chemistry have hitherto been seen as critical. For example, the amount of cold rolling and the number of stages of cold rolling have generally been regarded as critical despite the fact that cube-on-edge stock can be made by various routings. But the factors are also interrelated. It was taught by Littmann and Heck in U.S. Patent No. 2,599,340, issued June 3, 1952, that superior permeabilities could be obtained in silicon-irons which were hot rolled to the intermediate gauge from a high initial temperature. It has been ascertained that the high hot rolling temperature has to do in part at least with the solution and precipitation of sulfides such as manganese sulfide in the silicon-iron, and that the attainment of superior permeabilities by hot rolling from a high temperature was not entirely a matter of grain size or grain orientation at the end of the hot rolling.

It is a primary object of this invention to obtain cube-on-edge grain growth by a process which is less sensitive to ladle chemistry and processing variables than the hitherto known processes.

It is an object of the invention to produce a more vigorous and complete secondary grain growth in the final anneal.

It is an object of the invention to provide a way in which cube-on-edge secondary grain growth may be induced in silicon-iron sheet stock which under normal circumstances of processing would not exhibit this type of grain growth to any great degree.

Whereas the teachings of Ser. No. 378,823 mentioned above relate primarily to the manufacture of silicon-iron containing normal amounts of manganese, it has now been found that in the production of silicon-iron having a high degree of cube-on-edge orientation there is a relationship between the quantity of manganese present and the quantity of sulfur used as hereinafter taught. It is an object of the invention to provide optimum secondary grain growth with varying quantities of manganese.

It has also been discovered that there is a relationship between the extent of cold rolling and the ultimate permeability when the teachings of the said application, Ser. No. 378,823 and the teachings of this case are followed. It is an object of this invention to control the extent of the cold rolling reductions for the attainment of maximum permeability.

It is also an object of one aspect of the invention to provide a procedure for securing optimum cube-on-edge orientation with a single stage of cold rolling whereby the cost of the procedure is substantially lessened.

These and other objects of the invention which will be set forth hereinafter or will be apparent to the skilled worker in the art upon reading these specifications are accomplished in those procedures and products of which certain exemplary embodiments will now be described. Reference is made to the accompanying drawings in which:

FIGURE 1 shows graphically the effect of sulfur in the annealing atmosphere at various temperatures for normal manganese content.

FIGURES 2 through 7 inclusive are respectively charts showing areas of satisfactory secondary grain growth wherein increasing percentages of manganese are plotted against thicknesses of the sheet material in mils at given percentages of sulfur.

Figure 8:
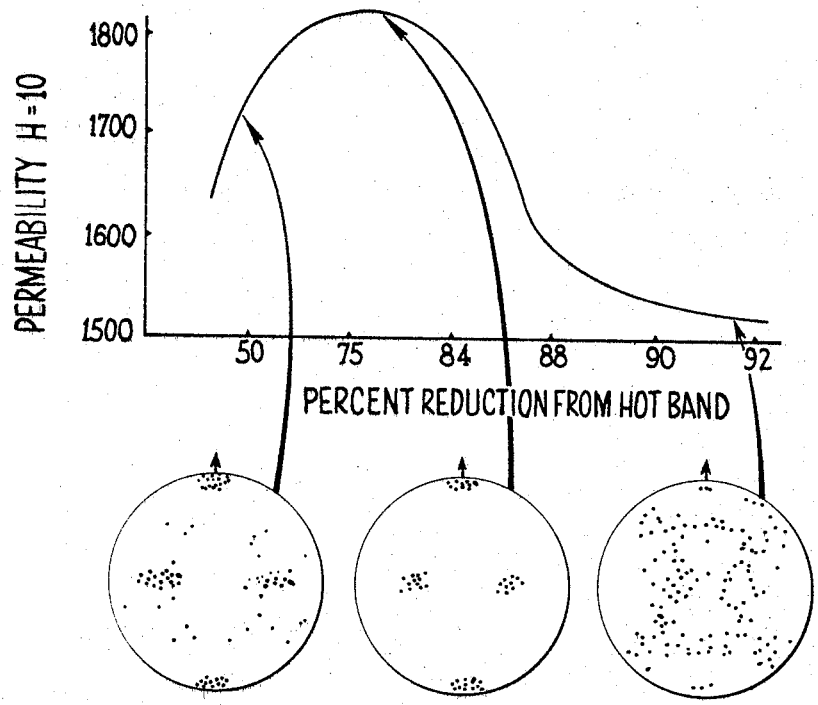

FIGURE 8 is a chart in which permeability at $H=10$ oersteds is plotted against percentage reduction from the hot rolled band in a single stage cold reduction. This figure also shows pole figures indicative of the degree of orientation obtainable at three points on the curve of the chart.

It is believed that the several two-dimensional charts forming FIGURES 2 through 7 in this case make a clearer showing than would be made by three-dimensional charts relating both managanese and sulfur contents to the thickness of the material.

It has hitherto been suggested that sulfur in the silicon-iron stock is of importance in the obtaining of a cube-on-edge orientation. The sulfur in the form of sulfides was understood to act as an inhibitor of normal grain growth after primary recrystallization. But the amount of sulfur present at that time was assumed to depend upon the sulfur in the melt. Also the distribution of the sulfur, which in turn depends upon the various heat treating steps practiced between the melt stage and the final anneal, was important. It was thus deemed necessary that the ladle analysis of the silicon-iron should show a substantial quantity of sulfur, say at least .015%, and that the subsequent processing should be such as to leave in the cold reduced stock at the time of the final anneal a sufficient quantity of sulfur to permit the attainment of the desired cube-on-edge orientation and grain size.

In accordance with the present invention it has been found that the quantity of sulfur in the ladle analysis may vary between much wider limits than was heretofore taught. The initial sulfur content may vary from extremely low values, say about .010% or somewhat less, to the values presently used; but the amount and distribution of sulfur necessary during an anneal in which primary grain growth occurs can be accurately controlled during or just before the anneal. Thus it is possible to allow the sulfur content of the stock at any stage of the processing to vary from values too low to effectively inhibit primary grain growth by prior processes to values even above those formerly considered the maximum. The upper limit is now determined by the degree to which the sulfur remaining after the final anneal harms the magnetic properties. The sulfide distribution is also much less a factor, especially since it can be controlled in a new way. By the same token, intermediate heat treatments at a temperature or in an atmosphere which may deplete the sulfur content at the grain boundaries, either before cold rolling or intermediate the various stages of cold rolling, will not prevent the attainment of the desired orientation and grain size in accordance with the practice of this invention.

Briefly, the practice of this invention involves the treatment of the silicon-iron sheet stock, containing predetermined quantities of manganese, with sulfur or sulfur compounds at final gauge and immediately prior to or during the primary grain growth portion of an anneal. There are various ways in which this can be done. The invention can be practiced by the addition of ferrous sulfide, or other sulfur compound which dissociates or decomposes at the temperatures of primary grain growth, to the annealing separator employed during the final heat treatment. Elemental sulfur can also be added to the separator for the same purpose.

The preferred annealing separators are magnesia, alumina and calcium oxide or mixtures of these, in finely divided form, although other substances may be used, if desired, such as titania and other refractory metal oxides. In the practice of this invention cube-on-edge secondary grain growth has been successfully induced in materials not suitable for such orientation and grain growth when treated in the conventional manner, by the addition of as little as 1/10 of 1% and up to about 1% of ferrous sulfide, or .005% to .025% of elemental sulfur to the annealing separator, both based on the weight of the metal charges. Or from about 1% to about 5% of sulfur may be added to the annealing separator if the separator is applied in a proportion of about 10 pounds per ton of silicon-iron. This is the equivalent of about 1/10 to about 1/2 pound of sulfur per ton of iron. It will be understood by one skilled in the art that the above ranges are preferred ranges.

The final anneal, which includes both a primary grain growth and a secondary grain growth, is usually an anneal in dry hydrogen in a muffle or box. The anneal may be carried on with the material in the form of stacked sheets or wound coils; and if the atmsophere of the annealing furnace is required to act upon the silicon-iron, excellent results may be obtained by annealing in loose coils formed in accordance with modern techniques. Whether or not the sheets in a pack or the convolutions of a coil are in close contact, it is preferred that the content of the sulfur-bearing material at the surfaces be maintained within the above limits.

It is believed that the sulfur or sulfur compound reacts with the dry hydrogen annealing atmosphere to form hydrogen sulfide and that the sulfur is transferred to the steel by means of the hydrogen sulfide as a carrier, and reacts with the steel to form sulfides at the grain boundaries. The reaction occurs between about 1000° F. and about 1800° F. The absorption creates high sulfur concentrations at the grain boundaries of the primary structure, tending to prevent the primary grain structure from undergoing such grain growth as would interfere with subsequent secondary recrystallization. Thus a finely grained matrix is maintained until secondary grains of cube-on-edge orientation begin to consume the grains of other orientations. Thereafter, as the temperature rises further, secondary grain growth will proceed by grain boundary energy and will convert the fine-grain matrix into a well developed cube-on-edge structure.

It follows from this explanation that instead of including sulfur or a sulfur-bearing compound in the annealing separator, comparable results may be achieved by charging the annealing atmosphere with hydrogen sulfide or any other gaseous sulfur compound, such as sulfur dioxide, sulfur hexafluoride and the like, which would react at the grain boundaries at temperatures around or slightly above 1000° F. This may be done during the primary grain growth period which occurs during the heating of the material up to the temperature at which secondary recrystallization occurs in a final anneal. It has also been found that selenium or hydrogen selenide behaves similarly to sulfur or hydrogen sulfide, although these substances are more expensive.

In yet another variant procedure, the sulfur or sulfur-bearing compound may be made available at the surfaces of the sheet material during a decarburizing anneal prior to the final anneal. For example, if a silicon-iron strip is moved through an elongated furnace containing a special atmosphere for removing carbon, it is possible to mix hydrogen sulfide with the decarburizing atmosphere to control grain growth during the primary grain growth stage occurring as part of the decarburizing treatment. As more specifically taught hereinafter, the hydrogen sulfide reacts with the iron surface to form a controlled iron sulfide film on the material which provides a source of sulfur to inhibit the primary grain growth which continues during the subsequent final anneal. The atmosphere for decarburizing is ordinarily wet hydrogen, which is oxidizing to silicon but relatively non-oxidizing to iron.

The best and most successful prior art procedure for the manufacture of cube-on-edge silicon-iron has involved hot rolling the material from a high initial temperature of about 2300° to about 2550° F., which is now understood to result in the solution of the manganese sulfide phase in the steel. The material, hot rolled in this manner to a gauge of about .100″ or less, is generally believed to contain a fine dispersion of sulfide inclusions formed by precipitation during hot rolling.

It is then cold rolled in one or two stages of closely controlled reduction to a final gauge of about .012″. There will have been at least one intermediate heat treatment involving a gaseous decarburization. By the time the material has been reduced to the final gauge mentioned above, the prior art has not disclosed hitherto any step or procedure which would insure the development of cube-on-edge secondary grain growth in the final anneal.

It is well understood that the primary grains can become so large that it is impossible for the cube-on-edge nuclei to absorb or consume large grains of undesirable orientation during the secondary growth period which begins at 1700° to 1800° F. and continues at higher temperatures. In accordance with the present invention it becomes possible to exert an external force during the period in which the primary grains are growing and prior to the secondary grain growth stage. This makes the processing steps and the ladle analysis less important. For example, secondary grain growth of excellent character has been successfully induced in materials which had been hot rolled from a low slab temperature of 2100° F. to a thickness of about .050″, pickled, annealed at 1675° F., cold rolled to about .011″ and then box annealed with sulfur added to the annealing separator. The permeability in the rolling direction at $H=10$ oersteds of one lot of this material which was annealed without adding sulfur was 1620; adding 2% sulfur to the magnesia coating of another lot of the same material increased its straight-grain permeability to 1775.

The amount of elemental sulfur or sulfur in the form of a sulfur-bearing compound added to the annealing separator has been determined broadly as from about .0025% to about .05% of the metal charge, or from about .05 to one pound of sulfur per ton of the metal charge. In terms of the sulfur content of the annealing separator, it is possible to use from about ½% to 10%, the aforementioned range of 1 to 5% being preferred based on 10 pounds of MgO per ton; but the quantity of sulfur made available to the silicon-iron may exceed the solubility of sulfur in the area of the grain boundaries. Some sulfur will be lost during the drying of a slurry coating and the handling of the dried coating. Therefore it is necessary to add sufficient excess to make up for this loss, and the values disclosed refer in all cases to the amount of sulfur or sulfide present during the heat treatment when the silicon-iron contains prescribed amounts of manganese as defined hereinafter.

The total sulfur content of the silicon-iron is not necessarily controlling. The presence of sulfides at the grain boundaries is of primary importance. It follows that a silicon-iron having sufficient sulfides at the grain boundaries may be suitable for primary and secondary grain growth even though its total sulfur content may be relatively low, whereas a treatment which tended to remove sulfides at the grain boundaries might impair the ability of the material to acquire a high degree of cube-on-edge orientation even though it did not appreciably lower the total sulfur content of the silicon-iron. Consequently, the preferred practice of this invention involves the later addition of some sulfide to the usual silicon-iron, substantially irrespective of its total sulfur content, especially since the sulfur or sulfide added by the procedures herein taught occurs primarily at the grain boundaries. By the time the charge is heated to the secondary recrystallization temperature of about 1800° F. the sulfur content will preferably have been increased by about .0005% to about .003%. Smaller amounts would indicate that the grain size has not been sufficiently retarded, while greater amounts might adversely affect magnetic properties. It will be understood by those skilled in the art that the amount of sulfur in the silicon-iron will decrease as the charge is heated to 2000° F. and above during the secondary grain growth period until the final sulfur in the silicon-iron is less than .005%.

Whether the sulfur is added to the annealing separator, or whether hydrogen sulfide or some other decomposable sulfur compound is added to the annealing atmosphere as such, the effective amount of sulfur present at any stage of the annealing is conveniently found by analysis of the annealing atmosphere if there is intimate contact of the steel and atmosphere. In the accompanying drawing, FIGURE 1 is based on such analysis. The shaded area is the area in which sulfur should be maintained throughout the temperature range of primary grain growth. This may be done by adding hydrogen sulfide or the like to the annealing atmosphere during primary grain growth or it may be done by including sufficient elemental sulfur or a decomposable sulfur compound in the annealing separator applied prior to the anneal.

It will be noted in FIGURE 1 that there is a range in which an iron sulfide scale is formed on the surfaces of the metal. Forming a thin layer of an iron sulfide scale about .02 mil to about .10 mil thick during a prior anneal of short duration, and then wrapping a coil tightly or stacking sheets for the final anneal, is another way in which the invention may be practiced.

The use of vacuum annealing is not precluded in the practice of this invention. Also, nitrogen or other inert gases may be used with or without hydrogen or in a partial vacuum. Sulfur is apparently capable of direct diffusion into the metal from the annealing separator or from a film of sulfide formed on the material prior to the final anneal.

Any of the routings heretofore employed in the manufacture of cube-on-edge stock may be employed in the practice of this invention; but other routings heretofore not considered to produce the best permeabilities can also be employed.

By silicon-iron is meant in general a ferrous material containing from about 2% to about 3.5% silicon, and from about .03% to about .15% manganese. A preferred although not limiting carbon content of the as-cast material should be usually about .025%, but the product should be subjected to a decarburization treatment as a part of the routing. The balance of the alloy should be substantially all iron excepting for normal trace impurities incident to the mode of manufacture, although the process of the invention may apply to any alloy in which the selective growth of particularly oriented grains is at least partially controlled by adding a grain growth inhibiting substance when the alloy is in a solid state. By "normal" manganese is meant a quantity of manganese in the silicon-iron of the order of about .10%.

Factors previously unknown have been found to affect the diffusion of sulfur. It has now been discovered that there is a relationship between the manganese content of the silicon-iron and the amount of sulfur or sulfur compound necessary to promote secondary recrystallization. It has also been discovered that there is a relationship between the amount of sulfur added and the cold work done on the material, in particular the cold reduction immediately preceding the final primary recrystallization.

It will be understood that the term "addition of sulfur" as used above may contemplate the use of sulfur or a sulfur-bearing compound either in the decarburizing or in the annealing atmosphere, or preferably in the annealing separator. In all cases, as explained in the copending applications, sulfur is actually absorbed by the sheet stock and appears to be concentrated in the grain boundaries.

FIGURES 2 through 7 plot percent manganese against thickness in mils after a two stage cold reduction for varying amounts of sulfur. These charts will also apply to material processed in three stages of cold reduction.

Figure 2:
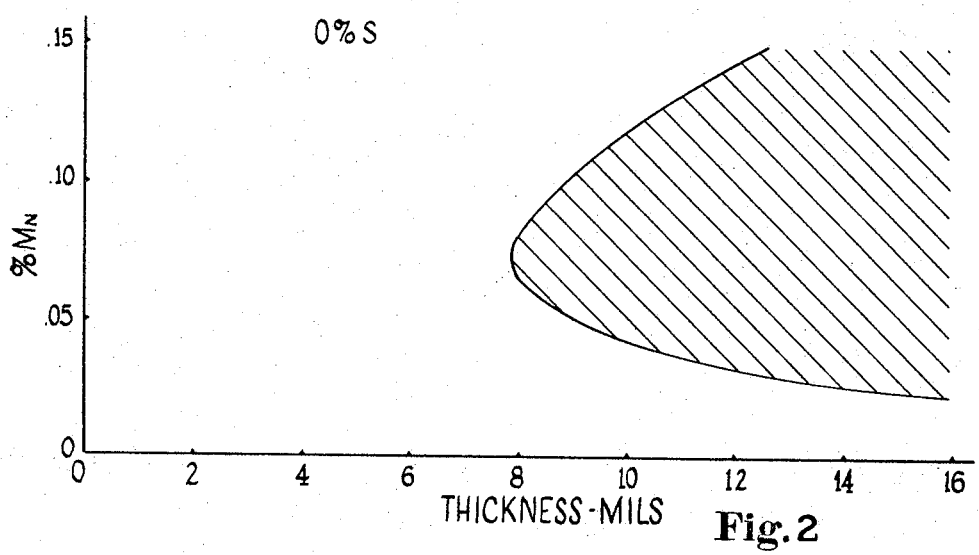

When no sulfur is added it will generally not be possible to obtain satisfactory secondary recrystallization in a material thinner than about 8 mils irrespective of the manganese content. This is shown in FIGURE 2.

Figure 3:
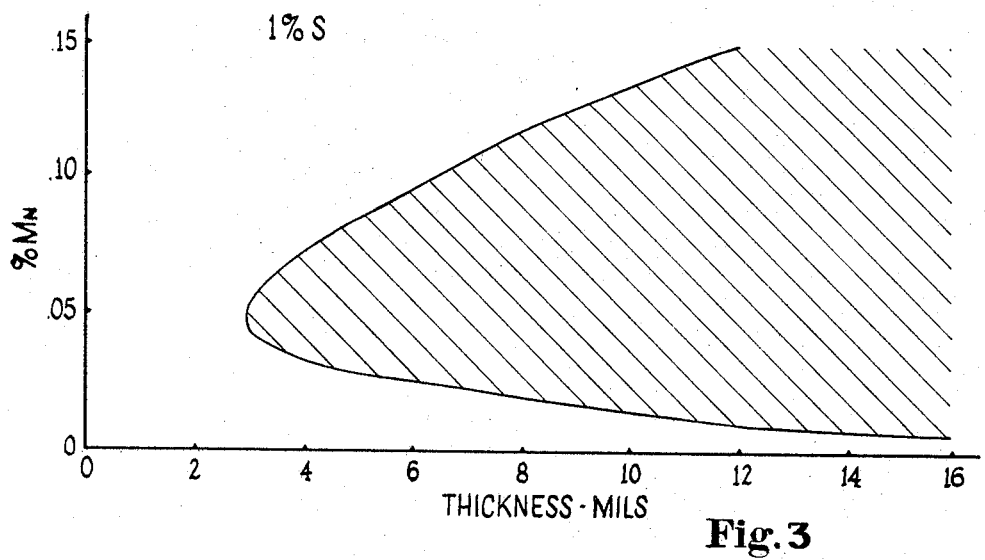

FIGURE 3 shows that the shaded area of satisfactory secondary grain growth upon the addition of 1% sulfur tends to peak substantially opposite the .05% manganese value. The thinnest material which undergoes secondary grain growth is about 3 mils thick. The manganese content of the material is critically low. At the higher thickness ranges of from 8 to 16 mils a considerable range of manganese will yield good results.

Figure 4:
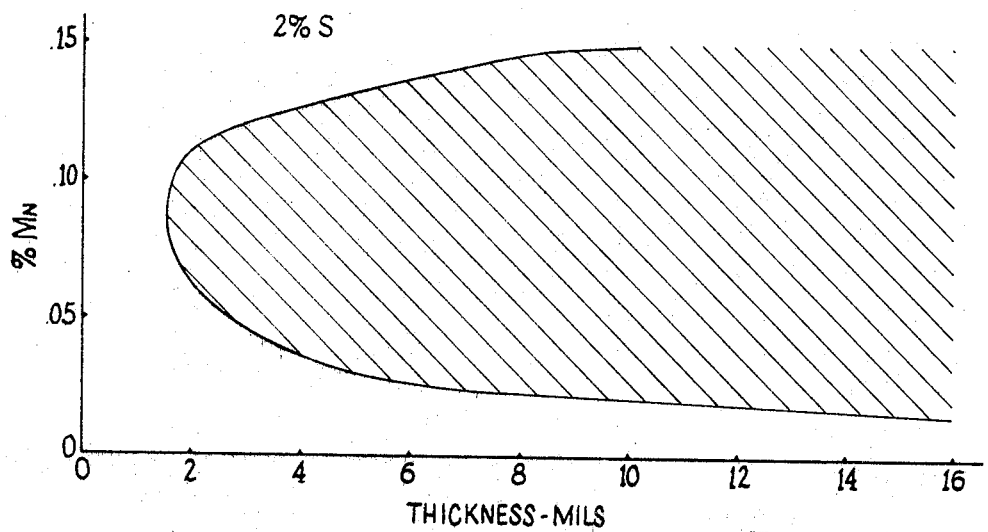

In FIGURE 4, with 2% sulfur added the shaded area has broadened in a vertical direction and it is possible to obtain satisfactory secondary recrystallization in thin silicon-iron at thicknesses as low as about 2 mils, wherein the manganese contents range substantially from about .07 to about .12%. The permissible manganese range broadens somewhat at greater final thicknesses of the product, and above 8 mils satisfactory secondary recrystallization can be achieved with manganese contents extending from about .03% to about .15% or beyond.

Figure 5:
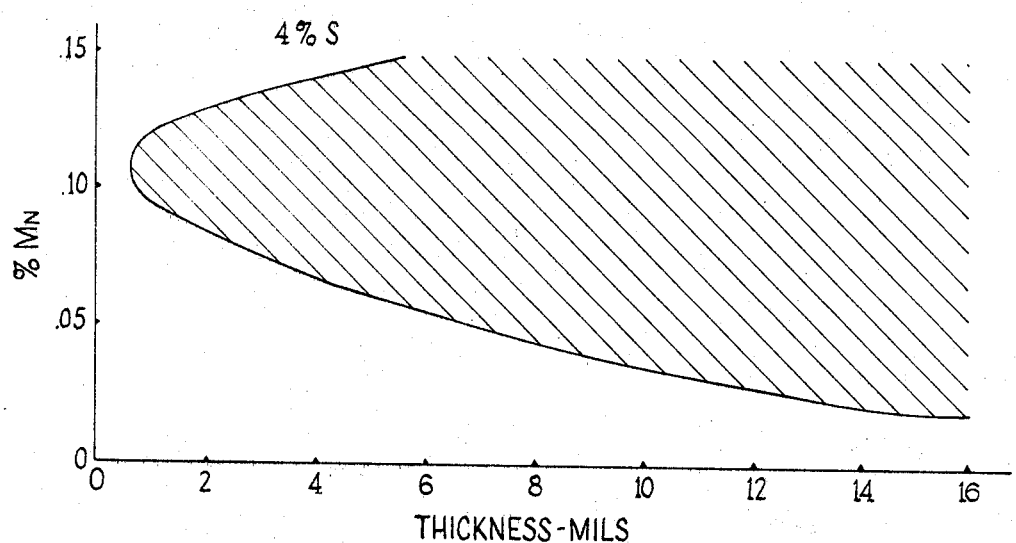
Figure 6:
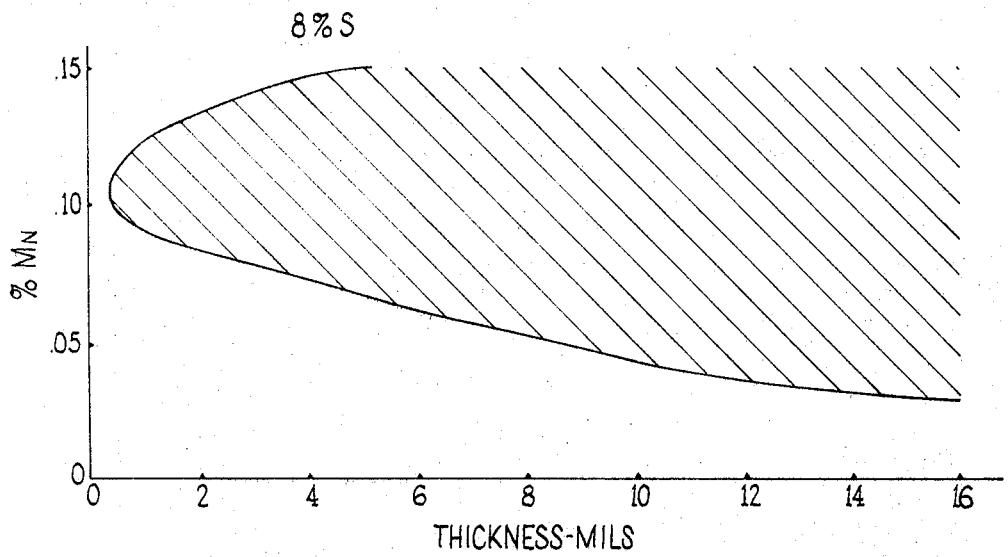

FIGURES 5 and 6 show shaded areas forming peaks roughly opposite the .10% manganese value. But the peaks of the shaded areas approach the ordinate line much more closely, indicating that satisfactory grain growth can be obtained even in very thin silicon-irons containing about .10% manganese when from about 4% to 8% of sulfur is added to the annealing separator. However, the bottom boundary of the shaded area slants gradually downward toward the right indicating that at 8 mils at least about .05% manganese is necessary. The minimum manganese value diminishes somewhat as 16 mils is approached, but FIGS. 5 and 6 indicate that in general the manganese content should not fall below about .03 to .04%.

Figure 7:
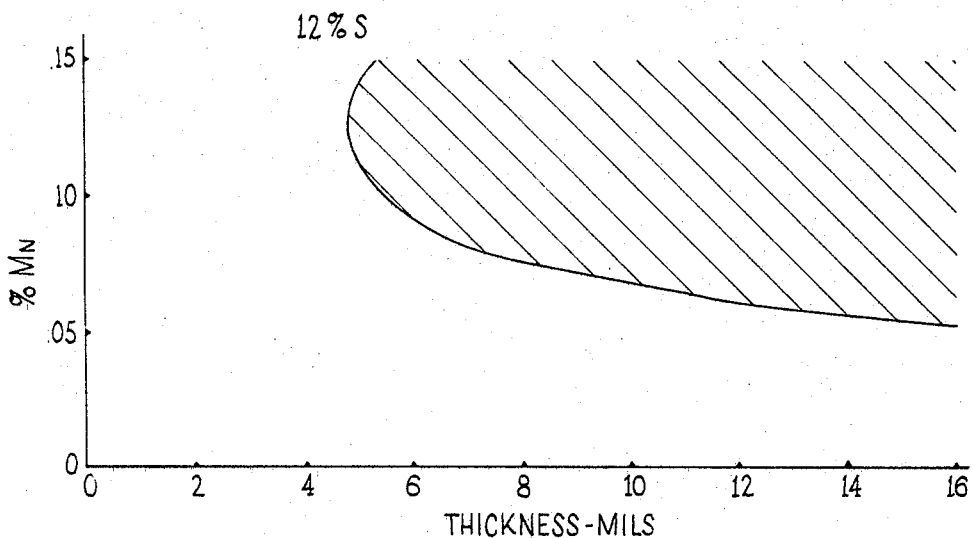

In FIGURE 7, however, which indicates an addition of about 12% sulfur, the shaded area has begun to recede upwardly and toward the right, indicating that the thinnest materials can no longer be successfully manufactured, and heavier gauges require a greater manganese content. While a 12% sulfur addition is not recommended, it is clear from FIG. 7 that 12% or more would be effective although not economical, and would be more difficult to remove. The maximum sulfur addition economically feasible and necessary under any known conditions is about 10%.

It should be noted that the above described figures do not take into account several factors which can shift somewhat the areas of secondary growth. Among these factors are variations in the amounts of elements other than manganese and sulfur, and the conditions under which the anneals are conducted, such as the atmosphere and its access to the surfaces of the silicon-iron. Departures from the exact shape of the curves on these charts may occur due to the above-mentioned variations, but the charts furnish an accurate indication of secondary grain growth as affected by the variables in the charts themselves.

The effective sulfur content in the environment of the silicon-iron should be maintained during the primary grain growth period until the temperature of the steel reaches about 1800° F. When this is done grain growth will be satisfactorily inhibited and the cube-on-edge grains will be free to take over and control the final orientation of the product during secondary growth. Generally speaking, the amounts of sulfur used effectively in the practice of this invention may be stated as follows where the manganese content is as taught herein:

(1) Where elemental sulfur, such as yellow powder or flowers of sulfur, is added to an annealing separator, about ½% to 10% sulfur, preferably 1% to 5% is used, based on the weight percent of the separator where the coating is used in normal thicknesses for annealing separation. This is equivalent to the use of about .0025% to about .05% of elemental sulfur based on the weight of the silicon-iron being treated.

(2) Where ferrous sulfide is used to provide the sulfur, the annealing separator should contain from about 1/10% to 1% of this compound.

(3) Where hydrogen sulfide is added to a decarburizing atmosphere to form a film or scale of iron sulfide to control primary grain growth in a subsequent anneal, the treatment should be so regulated as to form a sulfide scale having a thickness of about .0001" (.1 mil) to about .00002" (.02 mil).

(4) In any event, and whether or not sulfur is added to form an iron sulfide scale, or whether or not sulfur is added during the primary grain growth portion of a final anneal, the addition being made either to the annealing atmosphere or to an annealing separator, or both, best results are obtained when the quantity of sulfur so added is such as to raise the sulfur content of the steel by no more than about .003% and not less than about .0005% by the time the steel has reached a temperature of about 1800° F. in the final anneal, again depending on the manganese content.

Hitherto in the manufacture of cube-on-edge oriented silicon-iron, the best results have been obtained with routings including at least two stages of cold rolling. For example, a three percent silicon-iron cold rolled to a final thickness of about 14 mils in a single stage (and prior to the teaching of this case and the parent applications) will not normally exhibit vigorous true secondary recrystallization and can be expected to produce a permeability of about 1650 at $H=10$ oersteds. A few such heats react in a somewhat better way; but most heats will have low permeabilities especially if the silicon content is high.

It has now surprisingly been discovered that when the material is treated with sulfur and contains manganese having the relationship with sulfur set forth above, a single stage cold rolling affords an excellent way to attain a very high permeability and hence a high degree of cube-on-edge orientation.

This is illustrated in FIGURE 8 where permeability at $H=10$ oersteds is plotted against the percentage reduction of the material from the hot band thickness. FIGURE 8 also shows a typical pole figure for the orientations produced in each indicated region.

It is obvious from a study of FIGURE 8 that excellent results are obtained when the silicon-iron is reduced by cold rolling from an intermediate hot rolled gauge in a single stage with a reduction between about 65% and 85%, or preferably between 70% and 80%. The pole figure for this region shows a high degree of cube-on-edge orientation. Substantially all of the grains in this material will have an orientation within plus or minus 5° of the ideal (110) [001] texture. The permeability of the final product falls off drastically when the cold reduction is less than about 65% or greater than about 85%.

Whether or not a cold reduction can be practiced in a single stage will, of course, be determined by the thickness of the hot band and the desired final gauge. It has been found that a range of about 60% to about 80% of cold rolling reduction should be practiced in the final cold rolling stage of a process involving two or more cold rolling stages. The above mentioned amounts of cold reduction are considerably greater than that of the prior art practices in which reductions of about 50% were considered optimum.

Examples may be given as follows:

*Example I*

A silicon-iron containing .25% carbon, .101% manganese, .024% sulfur and 3.03% silicon was hot rolled to a thickness of .060" from a slab temperature of 2550° F. It was then annealed at 1800° F. and pickled, after which it was cold rolled in a single stage to a thickness of .014" and decarburized in an open or strand anneal at 1500° F. for 3 minutes, in wet hydrogen, i.e., hydrogen having a dew point of 130° F.

One lot of this material was box annealed in dry hydrogen at 2200° F., and was found to have a straight grain permeability at $H=10$ oersteds of 1595.

Another lot of the same material was box annealed at 2200° F. in a hydrogen atmosphere containing continuously about 770 p.p.m. of hydrogen sulfide. This material, treated in accordance with this invention, was found to have a straight grain permeability at $H=10$ oersteds of 1805.

*Example II*

A heat of silicon-iron originally containing .029% carbon, .116% manganese, .025% sulfur and 3.24% silicon was vacuum remelted, after which by analysis it was found to contain .016% carbon, .046% manganese, .015% sulfur and 3.08% silicon. The vacuum remelted stock was hot rolled to .049" from a slab temperature of 2400° F., annealed at 1675° F. and pickled. It was then cold rolled to .012".

One lot of this material was decarburized in an open or strand anneal at 1500° F. for 3 minutes in wet hydrogen as above defined. As a final treatment, this first lot was coated with magnesium oxide as an annealing separator and was box annealed at 2200° F. in hydrogen. It was found to have a straight grain permeability at $H=10$ oersteds of 1670.

A second lot of the same material was decarburized in an open or strand anneal at 1500° F. for 3 minutes in wet hydrogen having a dew point of 130° F. This atmosphere contained 2800 p.p.m. of hydrogen sulfide. A thin scale of iron sulfide was formed on the surface of the silicon-iron sheet stock. The silicon-iron sheet stock bearing the thin iron sulfide scale was coated with magnesium oxide and box annealed at 2200° F. It was found to have a straight grain permeability at $H=10$ oersteds of 1775.

*Example III*

The success of this invention in commercial mill practice was further substantiated by the following procedures.

Silicon-iron containing by a ladle analysis .025% carbon, .059% manganese, .019% sulfur and 2.58% silicon was hot rolled to .060", open annealed at 1800° F. and pickled, cold rolled to .014", and decarburized in a strand anneal at 1500° F. in a wet hydrogen atmosphere. One coil of this material was coated with a magnesia slurry containing no added sulfur and box annealed for several hours at 2175° F. in a hydrogen atmosphere. Another coil of the material was coated with a slurry of magnesia to which sulfur had been added. It was determined that the magnesia coating after drying contained ½% sulfur by weight. This coil was box annealed in exactly the same manner as the coil coated with the standard grade of magnesia. It was found that the magnetic permeability at 10 oersteds had been increased from 1735 to 1820 by the sulfur additions to the magnesia.

*Example IV*

(1) A coil was hot rolled to .076" from an initial temperature of 2550° F. The chemistry of the hot roll band was as follows:

| | Percent |
|---|---|
| Carbon | .027 |
| Manganese | .081 |
| Sulfur | .024 |
| Silicon | 3.16 |

(2) The hot band was initially strip annealed at 1675° F. for about two minutes and then pickled free of hot mill scale.

(3) The annealed hot band was cold reduced to .0205".

(4) This intermediate gauge stock was strip annealed at 1675° F. for about one minute and then pickled.

(5) The intermediate gauge stock was cold reduced more than 70% to a final gauge of .006".

(6) The 6 mil material was decarburized in a strip anneal at 1500° F. for 1.5 minutes in hydrogen having a dew point of 130° F.

(7) The material was coated with an aqueous slurry containing 2% sulfur added to pure MgO, and the coating was dried under low heat.

(8) The material was box annealed in a hydrogen atmosphere at 2150° F. for sixteen hours.

(9) Magnetic test results were:

Permeability at $H=10$ oersteds _____ 1820.
Watt Losses:
    P15:60 _____ .503 w/#.
    P15:400 _____ 6.56 w/#.
Grain Size _____ ASTM 4 at IX.

*Example V*

(1) A coil was hot rolled from an initial temperature of 2550° F. to .076". The chemistry was as follows:

| | Percent |
|---|---|
| Carbon | .026 |
| Manganese | .085 |
| Sulfur | .027 |
| Silicon | 3.11 |

(2) The hot band was initially annealed at 1675° F. for about two minutes and then pickled free of hot mill scale.

(3) The annealed hot band was cold reduced to .0195".

(4) The intermediate gauge stock was strip annealed at 1675° F. for about one minute and then pickled.

(5) The intermediate gauge stock was cold reduced about 80% to a final thickness of .004".

(6) The 4 mil material was decarburized for one minute at 1500° F. in hydrogen having a dew point of 130° F.

(7) The material was coated with an aqueous slurry containing 2% sulfur added to pure MgO and the coating was dried under low heat.

(8) The material was box annealed in a hydrogen atmosphere at 2150° F. for sixteen hours.

(9) Magnetic test results were:

Permeability at $H=10$ oersteds _____ 1800.
Watt Losses:
    P15:60 _____ .488 w/#.
    P15:400 _____ 6.03 w/#.
Grain Size _____ ASTM 5 at IX.

*Example VI*

(1) A coil had been hot rolled to .070" from an initial temperature of 2550° F. The chemistry was as follows:

| | Percent |
|---|---|
| Carbon | .025 |
| Sulfur | .024 |
| Manganese | .071 |
| Silicon | 2.98 |

(2) The hot band was annealed at 1675° F. for about two minutes and then pickled free of hot mill scale.

(3) The band was then cold reduced to .0190".

(4) The intermediate gauge stock was strip annealed at 1675° F. for about one minute.

(5) The annealed strip was cold reduced to .009".

(6) The 9 mil stock was strip annealed at 1675° F. for about one minute and then pickled.

(7) The 9 mil strip was cold reduced about 80% to a .0019" final thickness.

(8) The 1.9 mil stock was decarburized at 1500° F. for about thirty seconds in 130° F. dew point hydrogen.

(9) The decarburized stock was coated with an aqueous slurry containing 2% sulfur and 99% pure magnisia, and the coating was dried under low heat.

(10) The strip was box annealed at 2150° F. for sixteen hours in hydrogen.

(11) The magnetic properties were:

Permeability at $H=10$ oersteds _____ 1790.
Watt losses, P15:400 _____ 5.64 w./#.
Grain Size _____ ASTM 2 at IX.

Modifications may be made in the invention without departing from the spirit of it.

The embodiments of the invention in which an exclusive property or privilege is claimed are defined as follows:

1. In a process of producing cube-on-edge oriented silicon-iron sheet stock, said sheet stock containing from about 2% to about 3.5% silicon and from about .03% to about .15% manganese, which process comprises hot rolling, removing scale, cold rolling to final gauge, and subjecting said stock to a final anneal consisting of a primary grain growth stage and a secondary grain growth stage; the improvement comprising the steps of providing sulfur in the environment of the stock during said primary grain growth stage and diffusing said sulfur into the grain boundaries of said stock during said primary grain growth stage, whereby to inhibit primary grain growth and to favor the growth of cube-on-edge oriented nuclei during said secondary grain growth stage, and proportioning the quantity of said sulfur to the quantity of manganese in said silicon-iron and to the final gauge of said sheet stock so as to cause the silicon-iron to lie within the shaded areas of the charts constituting FIGS. 2 to 7 of the drawings hereof.

2. The process claimed in claim 1 in which the hot-rolled silicon-iron is reduced to final gauge in a single stage of cold rolling producing a reduction of at least about 65% and not more than about 85%.

3. The process claimed in claim 1 in which the hot-rolled silicon-iron is reduced to final gauge in a single stage of cold rolling producing a reduction of at least about 70% and not more than about 80%.

4. The process claimed in claim 1 in which the hot-rolled silicon iron is reduced to final gauge in at least two stages of cold rolling, there being an anneal intervening between the stages of said cold rolling, the final stage of said cold rolling producing a reduction of at least about 60% and not more than about 80%.

No references cited.

HYLAND BIZOT, *Primary Examiner.*

N. F. MARKVA, *Examiner.*